United States Patent [19]

Tannery

[11] 4,140,155
[45] Feb. 20, 1979

[54] SELF-PIERCING NEEDLE VALVE

[75] Inventor: Reinhard G. Tannery, Sterling Heights, Mich.

[73] Assignee: Brass Craft Manufacturing Co., Detroit, Mich.

[21] Appl. No.: 748,019

[22] Filed: Dec. 6, 1976

[51] Int. Cl.² .............................................. F16L 3/10
[52] U.S. Cl. .................................... 137/318; 285/197
[58] Field of Search ................ 137/317, 318; 285/197, 285/198, 199

[56] References Cited

U.S. PATENT DOCUMENTS

| | | | |
|---|---|---|---|
| 2,611,631 | 9/1952 | Benson | 285/197 |
| 2,790,652 | 4/1957 | Risley et al. | 137/318 |
| 3,038,490 | 6/1962 | Yocum | 137/318 |
| 3,489,441 | 1/1970 | Malcolm | 285/197 |
| 3,523,668 | 8/1970 | Logsdon | 285/197 |
| 3,554,217 | 1/1971 | Ehrens | 137/318 |
| 3,734,112 | 5/1973 | Finney et al. | 137/318 |

FOREIGN PATENT DOCUMENTS

| | | | |
|---|---|---|---|
| 53156 | 9/1945 | France | 285/197 |
| 1559036 | 3/1969 | France | 285/197 |
| 505046 | 5/1939 | United Kingdom | 137/318 |

Primary Examiner—Martin P. Schwadron
Assistant Examiner—G. L. Walton
Attorney, Agent, or Firm—Cullen, Sloman, Cantor, Grauer, Scott, & Rutherford

[57] ABSTRACT

A self-piercing needle valve having a body and a shank is adapted for mounting upon a pipe. A valve support plate extends transversely of and is secured to said shank and has a right-angle extension at one end. Said extension along its length on one side has a series of variably spaced parallel wedge-shaped slots corresponding to different pipe diameters. The support plate is adapted to extend transversely of and bear against one side of a pipe. An anchor plate is spaced from and opposed to the support plate and adapted to bear against the opposite side of said pipe. A transverse slot through one end of the anchor plate is adapted to loosely receive said extension upon one side of the pipe, with portions of said anchor plate bounding said slot retainingly nested within one of said notches. A fastener upon the other side of the pipe extends between and interconnects the opposing ends of said plates for drawing the plates together and for gripping the pipe therebetween.

1 Claim, 3 Drawing Figures

SELF-PIERCING NEEDLE VALVE

BACKGROUND OF THE INVENTION

Self-piercing needle valves have heretofore been mounted upon and secured to a pipe for communication therewith incorporating a pair of clamping plates with threaded fasteners arranged upon opposite sides of the pipe and extending between and interconnecting the respective plates for drawing them together to frictionally engage the pipe.

The difficulty with using a pair of such threaded fasteners resided in assembling the anchoring plates in opposed relation upon the pipe and holding them in spaced registry while selectively advancing both screws and for ultimately manually securing the needle valve upon the pipe. This was time-consuming and the assembly difficult in view of the need for projecting the fasteners through the respective plates and threading them and thereafter, drawing them up tightly.

SUMMARY OF THE INVENTION

The object of the present invention is to provide an improved clamp-mounting assembly for a self-piercing needle valve which overcomes the above difficulties and provides a fast and effective means for anchoring and securing such self-piercing needle valve upon a pipe.

This and other objects will be seen from the following specification and claims in conjunction with the appended drawing.

THE DRAWING

DETAILED DESCRIPTION OF THE INVENTION

Figure 1:
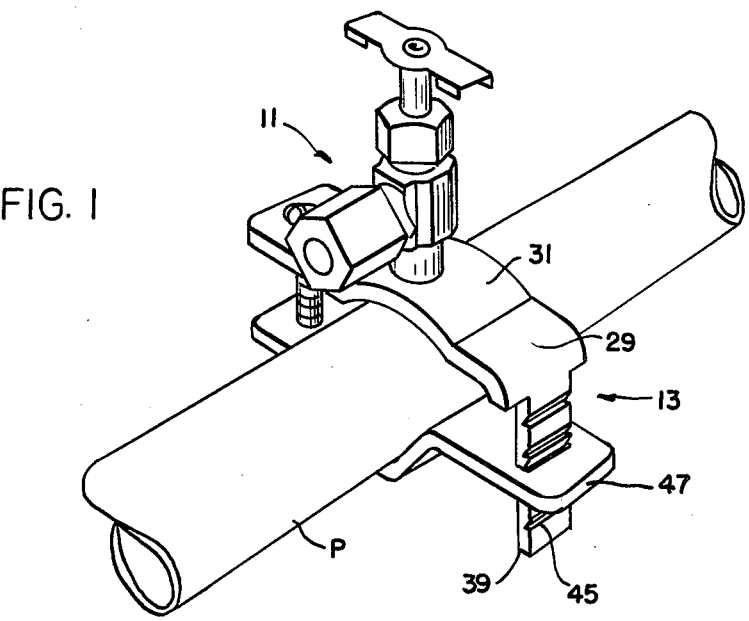
FIG. 1 is a perspective view of a self-piercing needle valve as mounted and secured upon a pipe, fragmentarily shown.

Referring to the drawing, there is shown in FIG. 1 a self-piercing needle valve 11 mounted on and secured to the pipe P by the present mounting clamp assembly 13.

The self-piercing needle valve is of a conventional construction which includes axially apertured body 15 with shank 17 at one end.

The interiorly threaded bore 19 within said body and shank receives the elongated threaded stem 21 which has, at one end, a pointed piercing shaft 27, and intermediate its ends, valve element 23 adapted for registry with seat 25.

Since this is a conventional construction, further details as to the structure, function and operation of the valve is omitted.

Figure 2:
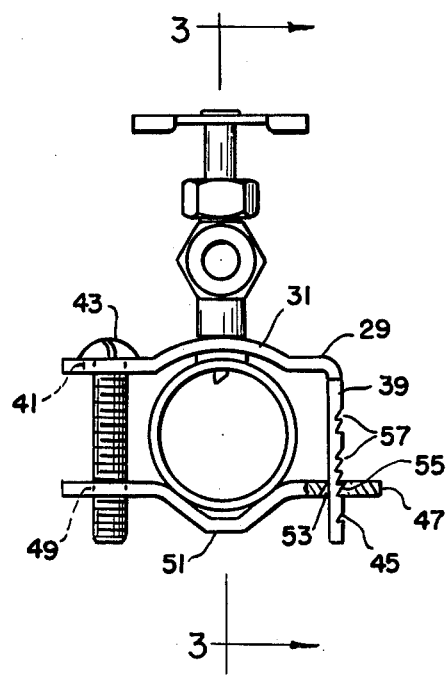
FIG. 2 is an end elevational view thereof.

The present invention is primarily directed to an improved means for anchoring a self-piercing needle valve upon pipe P in the manner shown in FIGS. 1 and 2.

The present mounting clamp assembly includes valve support plate 29 outwardly bowed at 31 intermediate its ends.

Figure 3:
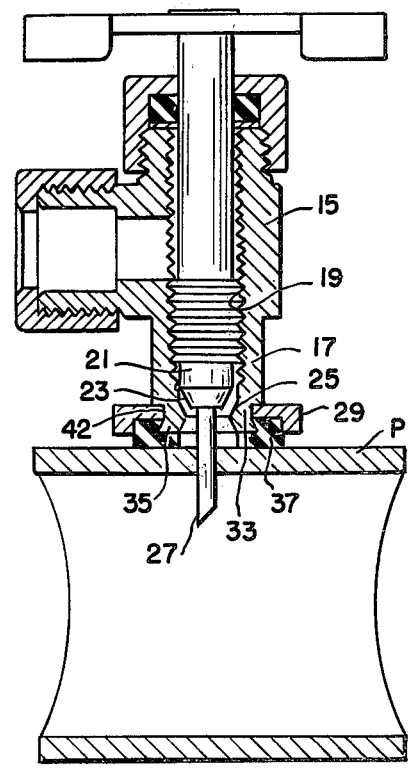
FIG. 3 is a section taken in the direction of arrows 3—3 of FIG. 2.

The mounting of the support plate to the shank includes shank extension 33, FIG. 3, of reduced diameter which extends through aperture 42 in plate 29 and riveted thereto as by the turned over rivet portion 35. A central portion of the support plate 29 is recessed to receive the snap-in rubber or otherwise resilient seal 37 for registry with a portion of the pipe P upon one side thereof. Said support plate has a right-angle end extension 39 of reduced width and adjacent its opposite end is apertured or slotted at 41 to receive bolt or fastener 43.

Along the length of the right-angular extension 39 are a series of variably spaced parallel wedge-shaped slots 45 corresponding to different diameter pipes such as, for example, three-eighths inch, one-half inch, five-eighths inch, three-fourths inch, seven-eighths inch and one inch. Elongated anchor plate 47 is spaced from and opposed to support plate 29, has an outwardly bowed central portion 51 and is adapted for registry with the opposite side of said pipe.

Said anchor plate adjacent one end has a threaded aperture 49 and at its opposite end, an angular slot 53 which defines with said anchor plate the wedge 55.

For assembly of the anchor plate 47 with respect to the support plate 29, the right-angle extension 39 is loosely projected through slot 53 until said anchor plate cooperatively registers with the opposing side of said pipe as shown in FIG. 2. The wedge 55 of said anchor plate cooperatively nests within one of the wedge-shaped slots 45 which are variably spaced as shown at 57 to correspond to the aforesaid pipes of different diameter. At the same time, the fastener 43 is threaded through the anchor plate and drawn up tightly with respect thereto with the wedge formation 55 fulcrumed and supported upon a portion of the extension corresponding to one of the wedge-shaped slots 45.

While the self-piercing needle valve has been shown in the drawing as being arranged above the pipe P, it is contemplated that for overhead pipes, the arrangement may be reversed with the self-piercing valve depending therefrom. In either event, upon the assembly of the plate 47 with respect to the support plate 29 and with the extension 39 assembled through the angular notch 53, it is merely a matter of drawing up and tightening the bolt 43 so as to threadedly engage anchor plate 47.

Though not a part of the present invention, in FIG. 3, the piercing shaft 27 is projected down into the pipe P with the valve element 23 partly unseated. In FIG. 2, the valve stem has been retracted by rotation thereof so as to permit full flow of fluid through the bore of the piercing valve and through its outlet fitting.

Having described my invention, reference should now be had to the following claims.

I claim:

1. In a self-piercing needle valve, having a body and a shank, adapted for mounting upon a pipe;

a valve support plate extending transversely of and intermediate its ends mounted on said shank and secured thereto;

said plate being apertured at one end; and a right angle extension at its other end;

said plate adapted to extend transversely of and bear against one side of said pipe;

said extension along its length on one side having a series of variably spaced parallel wedge-shaped slots corresponding to different pipe diameters;

an anchor plate spaced from and opposed to said support plate adapted to bear against the opposite side of said pipe and having a threaded aperture at one end;

there being a transverse slot adjacent the other end of said anchor plate loosely receiving said extension upon one side of the pipe, with portions of said anchor plate bounding said slot selectively and retainingly nested within one of said variably spaced slots;

and a screw fastener upon the other side of said pipe extending between and interconnecting the one ends of said plates for drawing the plates together and for gripping the pipe therebetween;

said transverse slot extending at an acute angle to said anchor plate;

said portion of said anchor plate being of wedge form and interlocked with said extension;

the securing of said support plate to said shank including a reduced end portion of said shank projected through an aperture in said support plate and riveted thereto;

each of said plates being bowed outwardly intermediate their ends to facilitate assembly onto said pipe;

said wedge form portion of said anchor plate being a fulcrum for said support plate and said extension whereby said support plate and said extension are pivoted relative to said anchor plate to fit around said pipe, said wedge form portion of said anchor plate locking said extension in place while said screw fastener is interconnected with said one ends of said plates.

* * * * *